(12) United States Patent
Morishita

(10) Patent No.: US 7,283,673 B2
(45) Date of Patent: Oct. 16, 2007

(54) IMAGE PROCESSING METHOD AND APPARATUS

(75) Inventor: Tadao Morishita, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 426 days.

(21) Appl. No.: 10/985,859

(22) Filed: Nov. 10, 2004

(65) Prior Publication Data

US 2005/0089229 A1    Apr. 28, 2005

Related U.S. Application Data

(62) Division of application No. 09/474,191, filed on Dec. 29, 1999, now Pat. No. 6,836,568.

(30) Foreign Application Priority Data

Jan. 6, 1999    (JP)    ............... P11-001397

(51) Int. Cl.
*G06K 9/68*    (2006.01)

(52) U.S. Cl. .................. 382/219; 382/283; 382/294

(58) Field of Classification Search ............... 382/218, 382/219, 283, 294
See application file for complete search history.

(56) References Cited

U.S. PATENT DOCUMENTS 5,182,656 A    1/1993    Chevion et al.

(Continued)

FOREIGN PATENT DOCUMENTS

JP    60-55474    3/1985

(Continued)

OTHER PUBLICATIONS

Koerich, et al, "System for Automatic Extraction of User-Entered Data from Banchecks", Proc. SIBGRAPI 1998, Int. Symp. On Computer Graphics, Image Processing and Vision, Oct. 20, 1998.

(Continued)

*Primary Examiner*—Bhavesh M Mehta
*Assistant Examiner*—John B Strege
(74) *Attorney, Agent, or Firm*—David G. Conlin; David A. Tucker; Edwards Angell Palmer & Dodge LLP

(57) ABSTRACT

An object of the present invention is to provide an image processing apparatus which allows a user to execute image processing, such as extraction and elimination of a portion common to a plurality of images therefrom, with a simple operation. An image of a document is read by a scanner, and when the document is a first one, the image of the document is stored from input means into storing means. When an image of a second document is read, comparing means compares the read image with the image stored in the storing means to judge whether or not a difference in pixel values between the first document image and the second document image is smaller than a threshold value set through setting means. A portion in which the difference in pixel values is judged smaller than the threshold value is recognized as a common portion, and in accordance with a result of selection by selecting means, the portion is sent as a result of extracting the portion common to the plurality of inputted images therefrom, to an image processing section via output means and printed by a printing mechanism, or the respective images from which the common portion is eliminated are sent from the output means to the image processing section and outputted by the printing mechanism.

3 Claims, 9 Drawing Sheets

U.S. PATENT DOCUMENTS

| | | | |
|---|---|---|---|
| 5,459,586 A | 10/1995 | Nagasato et al. | |
| 5,914,748 A | 6/1999 | Parulski et al. | |
| 6,088,468 A | 7/2000 | Ito et al. | |
| 6,167,167 A | 12/2000 | Matsugu et al. | |
| 6,453,069 B1 | 9/2002 | Matsugu et al. | |
| 6,512,850 B2 * | 1/2003 | Yaung .................... | 382/225 |
| 2002/0164074 A1 | 11/2002 | Matsugu et al. | |

FOREIGN PATENT DOCUMENTS

| | | |
|---|---|---|
| JP | 60-157644 | 8/1985 |
| JP | 63-163678 | 7/1988 |
| JP | 3-135163 | 6/1991 |
| JP | 5-145735 | 6/1993 |
| JP | 5-231837 | 9/1993 |
| JP | 9-61364 | 3/1997 |
| JP | 10-320566 | 12/1998 |

OTHER PUBLICATIONS

Okuda et al, "A Morphological Subtraction Scheme for Form Analysis", Proc. Of the 13th Int. Conf. On Pattern Recognition, vol. 3, Aug. 1996, pp. 190-194.

Koerich et al, "Automatic Extraction of Filled Information from Bankchecks", IEEE Int. Conf. On Systems, Man and Cybernetics, vol. 3, Oct. 1997, pp. 2151-2156.

* cited by examiner

IMAGE PROCESSING METHOD AND APPARATUS

This is a divisional patent application of U.S. patent application Ser. No. 09/474,191 filed Dec. 29, 1999, by Tadao Morishita (the same inventor as of this divisional application), entitled "Image Processing Method and Apparatus" now U.S. Pat. No. 6,836,568.

BACKGROUND OF THE INVENTION

1. Field of the Invention

The present invention relates to an image processing method and apparatus such as a copier, provided with functions of inputting and outputting an image, and in addition, capable of subjecting an inputted image to a predetermined process and outputting the image.

2. Description of the Related Art

In a digital copier which reads and outputs an image, the following well-known techniques are used: a technique of synthesizing a plurality of documents into a single document and outputting the single document; and an inserting and synthesizing technique of subjecting a masking process to an arbitrarily predetermined region of a document and thereby inserting another document into the document. Such a synthesizing technique as mentioned above is described in Japanese Unexamined Patent Publication JP-A 5-145735 (1993), for example. In this prior art, the user operates operating means such as an edit pad to set a trim region in an image from which trim region an image is extracted. The extracted image is inserted into a mask region in another image which is a base image, to be synthesized. By adding a twist to a method of specifying a mask region, it is possible to eliminate an unnecessary image region from an extracted image.

JP-A 5-145735 discloses elimination of an unnecessary image region by specifying a mask region. However, in the case of, for example, a hand-written note which is overwritten on a printed matter, it is difficult to definitely separate the note as a mask region, so that it is difficult to eliminate the note only by adding a twist to a method of specifying a mask region. Moreover, since it is necessary to prepare a display device and a terminal device such as operating means so that the user can specify a mask region, the overall apparatus tends to be upsized, and it gets hard to use the apparatus with ease.

Further, Japanese Unexamined Patent Publication JP-A 63-163678 (1988) discloses an automatic image checking apparatus for checking images of two objects, e.g., prints of seals. The automatic image checking apparatus extracts checking objects from the respective images on the basis of a portion common to the images of the two objects, and executes a checking process on the basis of the checking objects extracted from the respective images. At the time of extracting the checking objects, after the images of the two objects are mutually registered, an initial mask pattern is formed by considering a pixel density value of 1 or more to be 1 in the respective images while ANDing both the images, and a final mask pattern is generated by expanding the initial mask pattern. The images of the two objects are subjected to masking, respectively, by using the final mask pattern, with the result that the checking objects of the respective images are extracted. In JP-A 63-163678, a pixel density value of 1 or more is replaced with 1, so that the difference in density values of pixels, each of which has a pixel density value of 1 or more, is not reflected on extraction of a portion common to images of two objects therefrom.

Furthermore, Japanese Unexamined Patent Publication JP-A 5-231837 (1993) discloses a shape measuring method for working out the shape of a soldered part which is given to an electronic component on a packing board. In the shape measuring method, an angle of illumination to the soldered part given to the electronic component on the packing board is sequentially changed. At every predetermined angle, regular reflection light from the soldered part is picked up. For the purpose of eliminating an image of wiring or the like which is common to both images, data of the images shot at every predetermined angle are subjected to a process of subtracting one from the other. On the basis of data of the images obtained in the subtracting process, the three-dimensional shape of the soldered part is worked out. In JP-A 5-231837, the data of the images is subjected to a process of subtracting for each pixel as it is, so that the magnitude of the difference in pixel values is not reflected on elimination of an image common to both images.

SUMMARY OF THE INVENTION

An object of the invention is to provide an image processing method and apparatus capable of carrying out image processing such as elimination of an unnecessary portion, with a simple operation.

The invention provides an image processing apparatus comprising at least:

input means for carrying out a distribution process of image information inputted through an image input mechanism;

storing means for storing an image inputted through the input means;

comparing means for comparing an image inputted through the input means with an image stored in the storing means; and output means for outputting a result of comparison by the comparing means, wherein the comparing means includes calculating means for calculating a difference in pixel values which represent pixel densities, between an image newly inputted through the input means and an image stored in the storing means, and recognizing means for recognizing a portion common to images by comparing an output of the calculating means with a preset threshold value.

According to the invention, image information inputted through the input means is stored in the storing means, and an image newly inputted through the input means is compared with the image stored in the storing means, by the comparing means. The comparing means includes the calculating means for calculating the difference in pixel values, which represent pixel densities, between a newly inputted image and the stored image, and the recognizing means for recognizing a portion common to the images by comparing an output of the calculating means with a threshold value, so that only by sequentially inputting image information into the input means, image processing based on recognition of a portion common to the images can be carried out.

As shown above, according to the invention, the comparing means compares an image newly inputted to the input means with an image stored in the storing means, and a comparison result is outputted from the output means. In the comparing means, the calculating means calculates the difference in pixel values between the image inputted through the input means and the image stored in the storing means, and the recognizing means recognizes a portion common to the images by comparing an output of the calculating means with a threshold value. A result of comparison by the comparing means contains a result of recognition of the portion common to the images by the recognizing means, so that only by inputting images, the user is capable of obtaining a result of image processing based on the portion common to the images.

Further, in the invention it is preferable that:

at least three or more kinds of image information are sequentially inputted to the input means;

the output means replaces an image outputted from the comparing means with an image stored in the storing means; and the recognizing means recognizes a portion common to an image newly inputted through the input means and the image stored in the storing means by comparing the images.

According to the invention, while sequentially inputting three or more kinds of images, the user is capable of making the apparatus sequentially carry out image processing based on recognition of a portion common to an image inputted immediately before and a newly inputted image and extract the common portion in a reliable manner. As shown above, according to the invention, while sequentially inputting at least three or more kinds of image information, the user is capable of making the apparatus recognize a common portion and sequentially carry out image processing based on a result of recognition of the common portion.

Still further, in the invention it is preferable that the comparing means includes extracting means for causing the output means to output only a pixel of which the difference in pixel values calculated by the calculating means is equal to or less than the threshold value.

According to the invention, extracting means included in the comparing means causes the output means to output only a pixel of which the difference in pixel values calculated by the calculating means is equal to or less than the threshold value, so that it is possible to make the apparatus output as an image, only a common portion in which the difference in pixel values is equal to or less than the threshold value. As shown above, according to the invention, the calculating means calculates the difference in pixel values, and the extracting means causes the output means to output only a pixel of which the difference in pixel values is equal to or less than the threshold value, so that it is possible to make the apparatus output as an image, only a common portion in which the difference in pixel values is smaller than the threshold value.

Still further, in the invention it is preferable that the comparing means includes eliminating means for causing, when the difference in pixel values calculated by the calculating means is equal to or less than the threshold value, the output means to output the inputted image and the stored image as two images, while preventing a pixel of which the difference in pixel values is equal to or less than the threshold value, from being outputted into the respective images.

According to the invention, the comparing means includes the eliminating means, so that when the difference in pixel values calculated by the calculating means is equal to or less than the threshold value, it is possible to make the apparatus eliminate a common portion in which the difference in pixel values is equal to or less than the threshold value, from an inputted image and a stored image, and output both the images. As shown above, according to the invention, the image processing apparatus can output an inputted image and a stored image from the output means, respectively, when the difference in pixel values is equal to or less than the threshold value, so that the apparatus can output the images from which a common portion is eliminated in a simple manner.

Still further, in the invention it is preferable that the comparing means includes extracting means for causing the output means to output only a pixel of which the difference in pixel values calculated by the calculating means is equal to or less than the threshold value, and eliminating means for causing, when the difference in pixel values calculated by the calculating means is equal to or less than the threshold value, the output means to output the inputted image and the stored image as two images, while preventing a pixel of which the difference in pixel values is equal to or less than the threshold value, from being outputted thereinto, the apparatus further comprises selecting means for selecting one of the extracting means and the eliminating means which are included in the comparing means, to be put into operation.

According to the invention, the user can select through the selecting means, either extracting a common portion in which the difference in pixel values is equal to or less than the threshold value by the extracting means and outputting the common portion, or eliminating the common portion by the eliminating means and outputting images. As shown above, according to the invention, the apparatus is equipped with both a facility to extract a common portion from images to output the common portion as an image and a facility to eliminate a common portion from images to output the images, and capable of activating both the facilities selectively.

Still further, an image processing apparatus of the invention further comprises setting means for allowing the user to set the threshold value.

According to the invention, the image processing apparatus is equipped with the setting means for allowing the user to set a threshold value used in comparison of the differences in pixel values between the inputted image and the stored image in recognizing a portion common to the images by the recognizing means included in the comparing means, so that the user is capable of arbitrarily setting a level of the difference in pixel values which is recognized as a common portion, and making the apparatus recognize a common portion properly in accordance with the density of an inputted image and carry out image processing with a recognition result reflected. As shown above, according to the invention, the user is capable of using the setting means to set a threshold value used for comparing the difference in pixel values, so that the user is capable of setting an allowable range of the difference in pixel values between images which is recognized as a common portion, and regulating a status of recognizing a common portion in accordance with the density of an image to be processed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
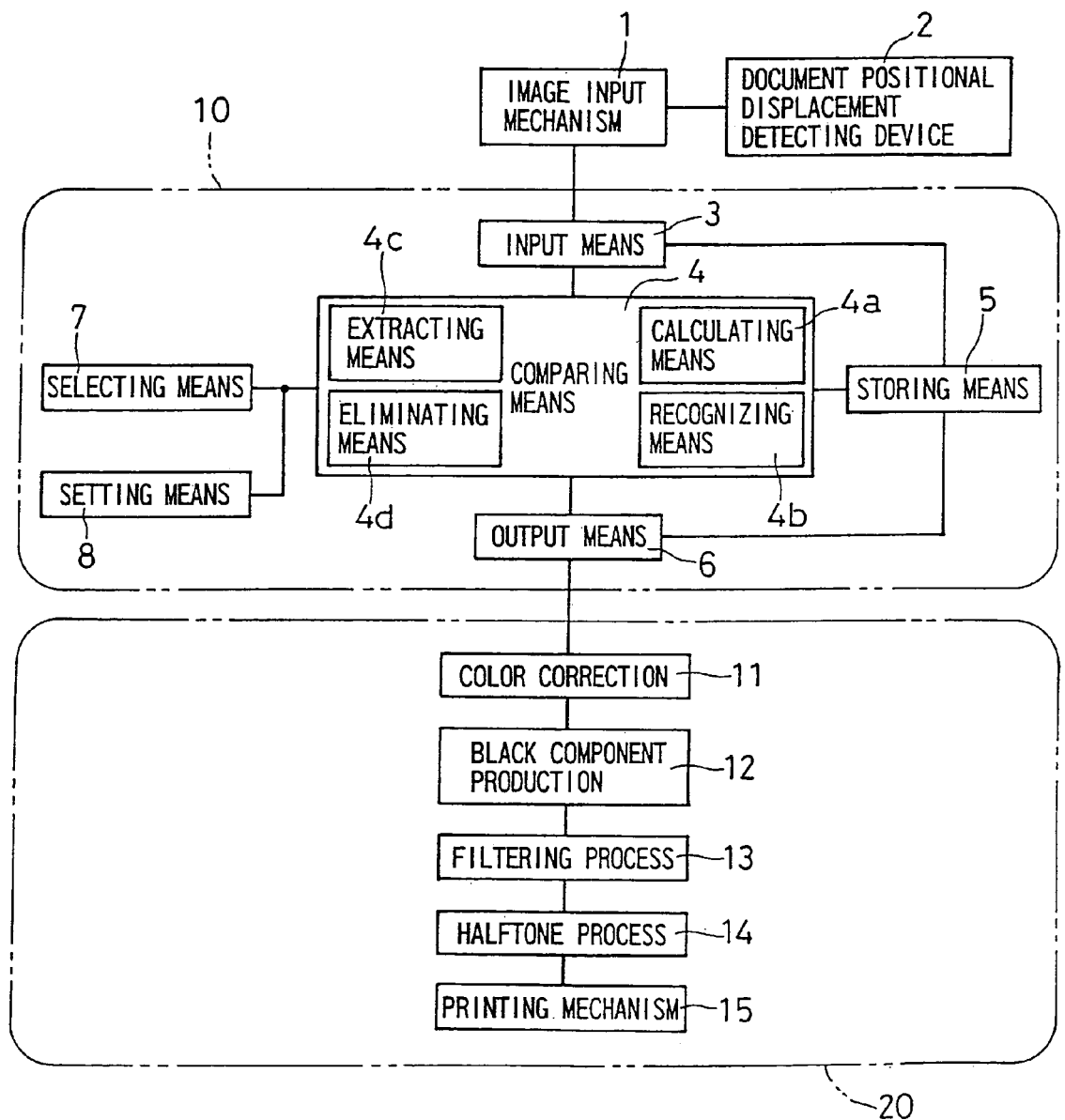
FIG. 1 is a block diagram showing a schematic diagram of an image processing apparatus of an embodiment of the invention.

Now referring to the drawings, preferred embodiments of the invention are described below.

FIG. 1 shows a schematic configuration of an image processing apparatus which is applied to a color digital copier, as an embodiment of the invention. Image information is read from a document by an image input mechanism formed by a scanner 1 or the like. The image input mechanism reads the document as a collection of pixels, and outputs by converting each pixel to 8 bits of digital data from 0 to 255 in accordance with the density of each pixel. In the case of reading a color image, the image input mechanism outputs by converting the respective components of RGB primary colors of red, green and blue to digital data from 0 to 255 in accordance with the density of each pixel. An output is the densest when a value is 255, while an output is colorless, that is, printing is not carried out when a value is 0. This output value will be expressed as a pixel value hereinafter. A CCD (charge coupled device) sensor which reads an image from a document one-dimensionally or two-dimensionally is included in the image input mechanism, and the size of a pixel to be read is determined corresponding to the size of a light-receiving device included in the CCD sensor and the configuration of an optical system such as a lens included in the image input mechanism 1.

In a case where the scanner 1 reads a plurality of documents, it cannot be avoided that a positional displacement is caused between the documents. A document positional displacement detecting device 2 stores the position of a document put on a document base, and when a new document is put on, the device 2 compares the position of the new document with the position of the previous document, thereby detecting a positional displacement between the documents. Detection of a positional displacement between documents is carried out by using an output from the scanner 1, for example, relative to the position of a specific corner of a rectangular document.

A signal which corresponds to an image of a document read by the scanner 1 is inputted to input means 3, and sent to either comparing means 4 or storing means 5. The comparing means 4 can work as calculating means 4a which has a calculating function, recognizing means 4b which has a recognizing function, extracting means 4c which has an extracting function, and eliminating means 4d which has an eliminating function, respectively, which will be described later. The storing means 5 is constituted by a semiconductor memory, a disk device and the like, and capable of storing an image inputted to the input means 3 as data composed of pixel values of respective pixels. The comparing means 4 is also capable of comparing an image inputted to the input means 3 with an image stored in the storing means 5. Outputting means 6 outputs an image to be subjected to image processing in accordance with a result of comparison by the comparing means 4. Selecting means 7 selects a function of the comparing means 4 from the extracting function and the eliminating function. Setting means 8 sets a threshold value which is used when the comparing means 4 compares images. A common image recognition processing section 10 includes the input means 3, the comparing means 4, the storing means 5, the output means 6, the selecting means 7, and the setting means 8, which are explained above.

An image outputted from the output means 6 of the common image recognition processing section 10 is sent to either color correcting means 11 or the storing means 5, depending on each case. The output means 6 also has a function of sending an image read out of the storing means 5 to the color correcting means 11. The details of the processing method will be described later. The color correcting means 11 carries out color correction of an inputted color image. Black producing means 12 produces a black component from an inputted color image. Filter processing means 13 corrects a space frequency response, thereby carrying out a filter process so as to prevent a blur and granularity deterioration of an outputted image. Halftone processing means 14 processes the tone of an image so as to become suitable for print of an image processing result at a printing mechanism 15. The printing mechanism 15 outputs and prints an image of the image processing result onto a recording medium such as a sheet of paper. The color correcting means 11, the black producing means 12, the filter processing means 13, the halftone processing means 14, and the printing mechanism 15 compose an image processing section 20 which is an equivalent one mounted in a color digital copier in general.

Figure 2:
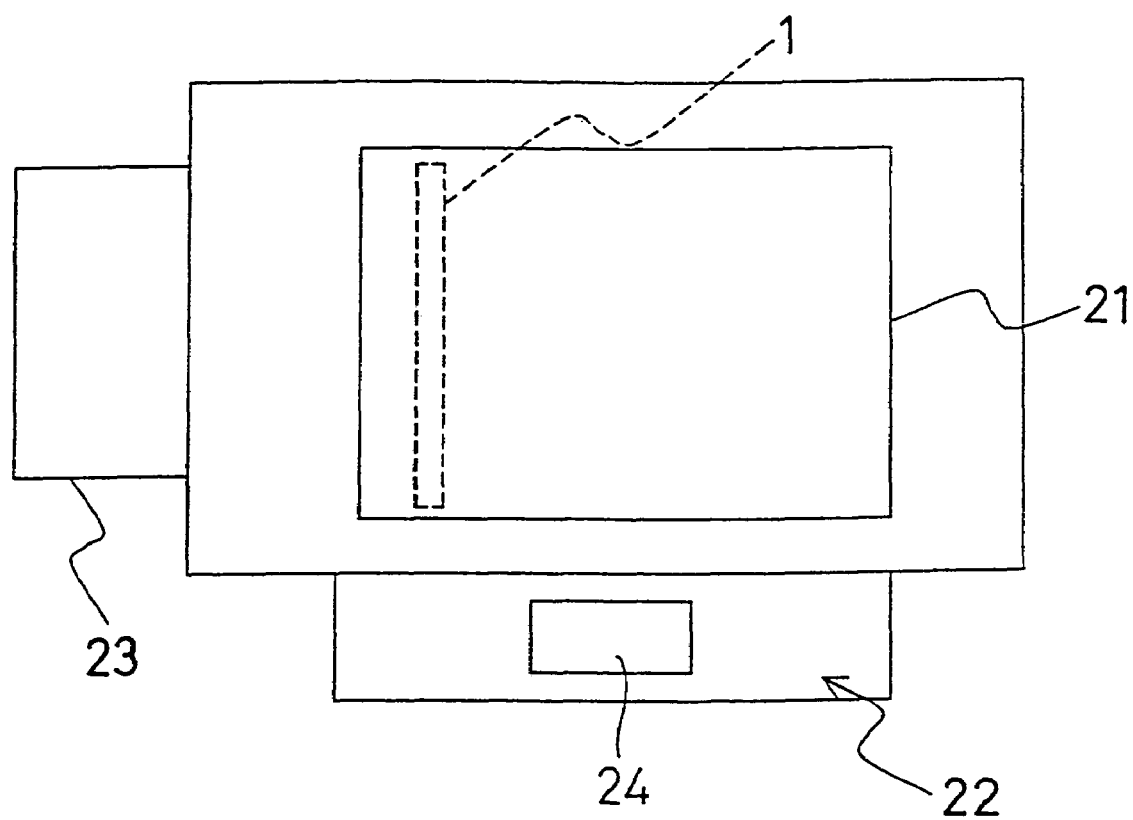
FIG. 2 is a simplified plan view of a color digital copier to which the image processing apparatus of FIG. 1 is applied.

FIG. 2 shows an example of a plan view of the color digital copier shown by FIG. 1. On the top of the color digital copier, an almost horizontal document base 21 is placed. The document base 21 is made of transparent glass or the like, and a document is put on the top face of the document base 21 so that a surface from which an image is read points downward. Below the document base 21, the scanner 1 is placed. The document base 21 has a rectangular shape, and the scanner 1 has a length almost equal to a length of a shorter side of the document base 21, so that the scanner 1 can read an image of a document one-dimensionally. The scanner 1 is movable along a longer side of the document base 21, and capable of reading an image of a document two-dimensionally while moving. The color digital copier is operated through an operating section 22, and an outputted image having been subjected to image processing is ejected to a document ejecting tray 23.

Figure 3:
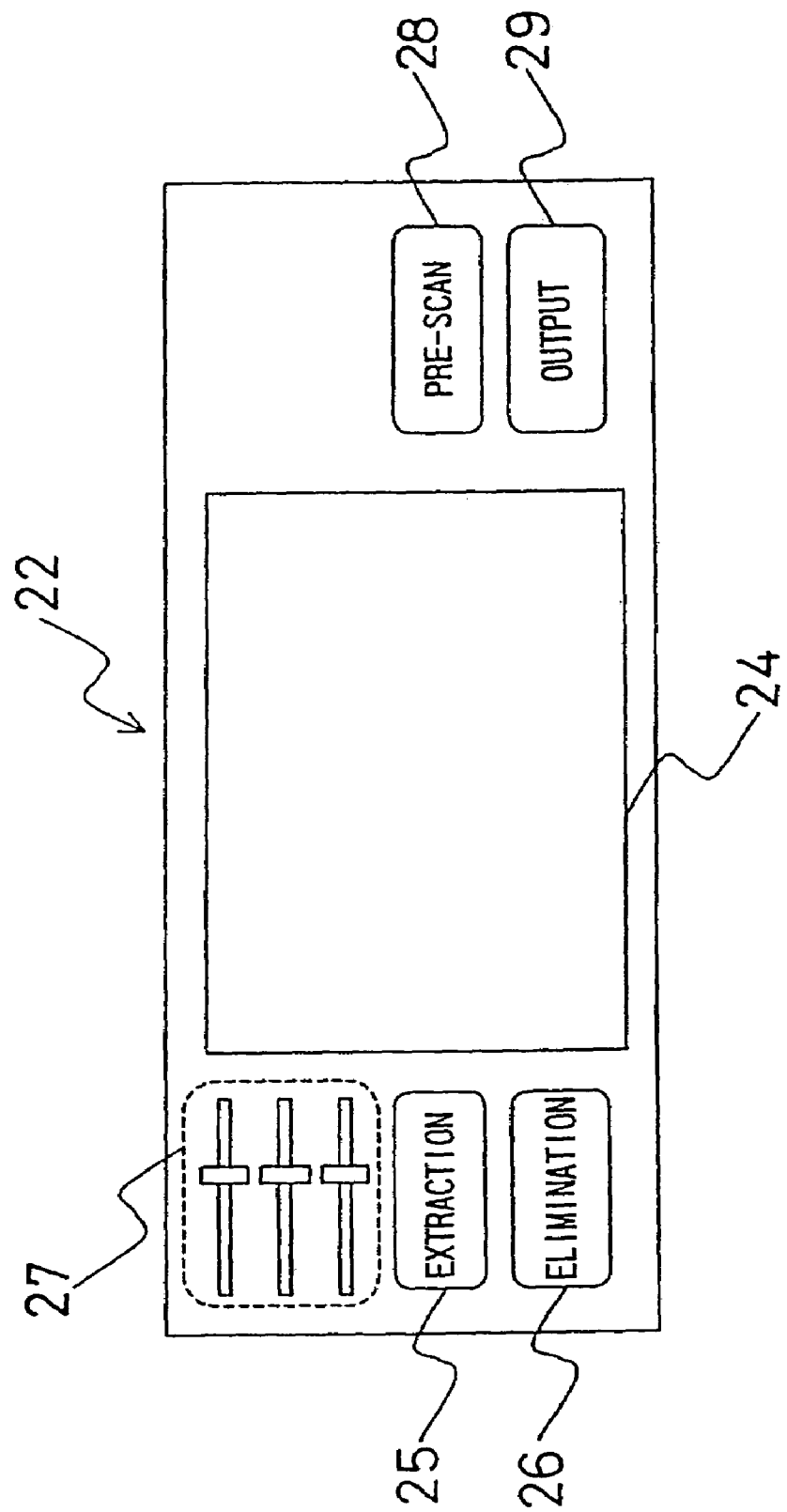
FIG. 3 is a partial plan view showing a configuration of an operating section 22 which is mounted on the color digital copier of FIG. 2.

FIG. 3 is an example of a configuration of the operating section 22 shown by FIG. 2. The operating section 22 is provided with a display panel 24 formed by a liquid crystal display (LCD) device or the like. The display panel 24 displays directions to operate the color digital copier, a working status of the copier, a warning of a positional displacement of a document, and the like. An extracting button 25 and an eliminating button 26 which switch a function of the comparing means 4 of FIG. 1 to the extracting function or the eliminating function (the selecting means 7) are placed in the vicinity of the display panel 24 of the operating section 22. A threshold value used when the comparing means 4 compares images can be set by operating a threshold value setting section 27 (the setting means 8). The threshold value setting section 27 includes sliding knobs for individually setting threshold values for the respective components of primary colors of red, blue and green of a color image. When the knobs of the threshold value setting section 27 are adjusted and threshold values are set for the respective colors, signals representing the threshold values are supplied to the comparing means 4.

Figure 4:
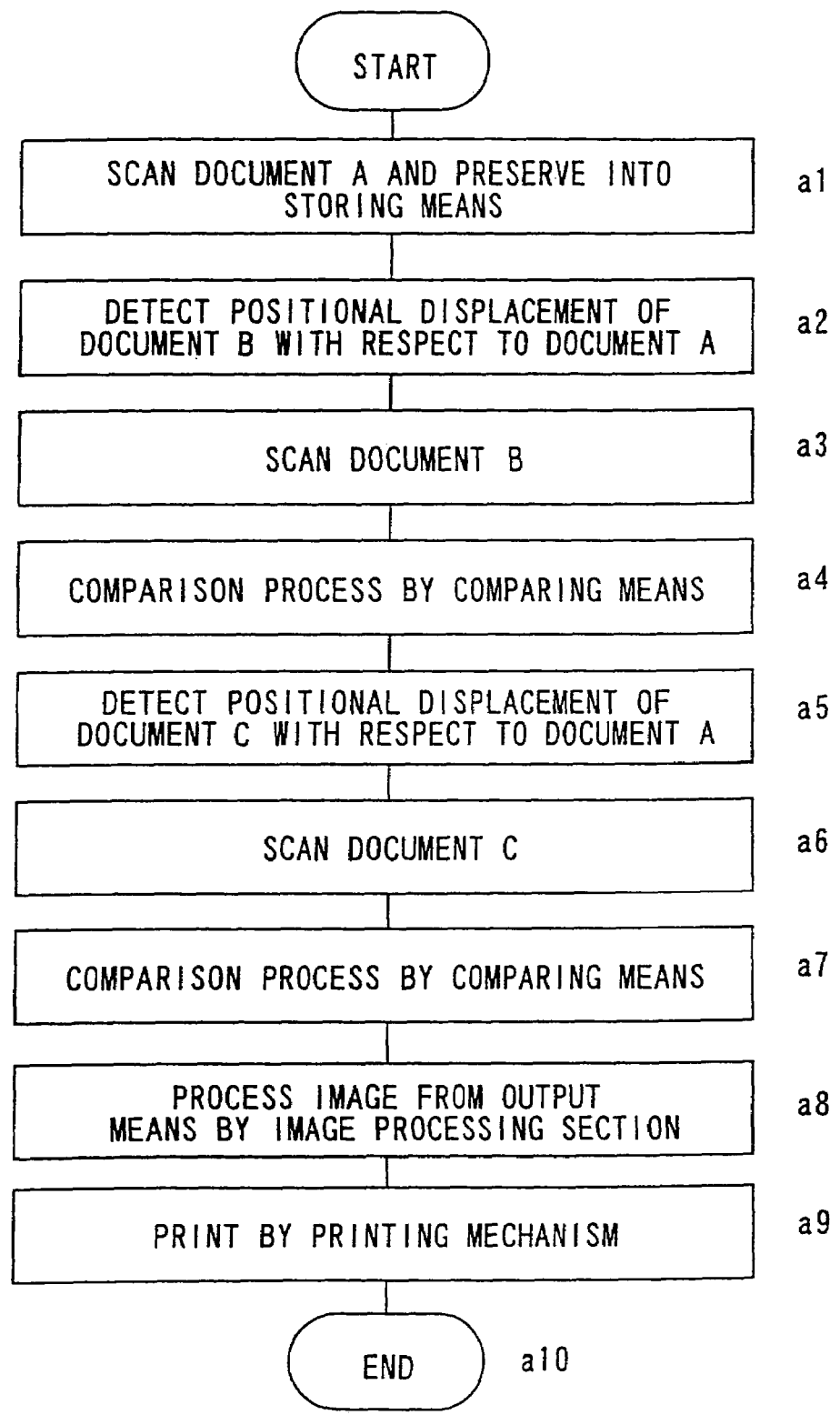
FIG. 4 is a flow chart showing steps of a processing procedure during operation of an extracting facility in the image processing apparatus of FIG. 1.

FIG. 4 shows steps of an operation of extracting a common portion from three documents in the image processing apparatus shown by FIG. 1. First, at step a1, the user conducts an operation of putting a first document A on the document base 21 shown in FIG. 2 and pushing a pre-scan button 28 shown in FIG. 3. The scanner 1 reads an image of the document A while moving, and image information representing a read image is supplied from the input means 3 to the storing means 5, where the image information is stored and preserved.

At step a2, the user removes the first document A from the document base 21, and puts a second document B on the document base 21. The document positional displacement detecting device 2 shown in FIG. 1 detects a positional displacement between the document A and the document B. In a case where a positional displacement is detected, the display panel 24 displays the fact to warn the user. When warned, the user corrects the position of the document B so that the positional displacement between the documents is solved. At step a3, the user pushes the extracting button 25 to designate the extracting function. When necessary, the user sets a threshold value through the knobs of the threshold value setting section 27. Next, when the pre-scan button 28 is pushed, the copier starts scanning the document B. When scanning the document B is started, the comparing means 4 compares on a pixel-by-pixel basis, an image of the document B read by scanning with the image of the document A stored in the storing means 5 at step a4. A comparison result is stored in the storing means 5.

When scanning the document B and comparing the document B with the document A for all the pixels are finished, the user removes the document B from the document base 21 and puts a third document C on the document base 21 at step a5. The document positional displacement detecting device 2 detects a positional displacement of the document C with respect to the document A, and warns the user through the display panel 24 in a case where a displacement is detected. When a displacement exists, the user corrects the position of the document C to solve the positional displacement. Next, at step a6, the user pushes an output button 29 to start scanning of the document C. Image information on the document C read by the scanner 1 is compared with the storage contents in the storing means 5 on a pixel-by-pixel basis by the comparing means 4 at step a7. In the storing means 5, a portion common to the document A and the document B is stored, and as a result of comparing the document C with the storage contents, an image of a portion common to the documents A, B and C is supplied as a comparison result from the comparing means 4 to the output means 6. When all of the pixels of the document C are scanned and compared, image processing needed for printing is carried out by the color correcting means 11 through the halftone processing means 14 included in the image processing section 20 at step a8. At step a9, an image processing result is printed by the printing mechanism 15.

In the case of subjecting N sheets of documents to the extracting process (wherein N denotes an integral number of 4 or more), second to $(N-1)^{th}$ documents are processed by repeating steps a2 to a4, and an $N^{th}$ document is processed at steps a5 to a7. As shown in FIG. 4, in the process of extracting a common portion, it is possible to easily produce a master document from documents among which a master document is not present, for example, by eliminating only written-in portions from documents of printed matters with the same contents in which notes are written in and printing the documents, or extracting and printing only portions of frames and the same sentences from a plurality of quotes or the like with the same base style.

Figure 5:
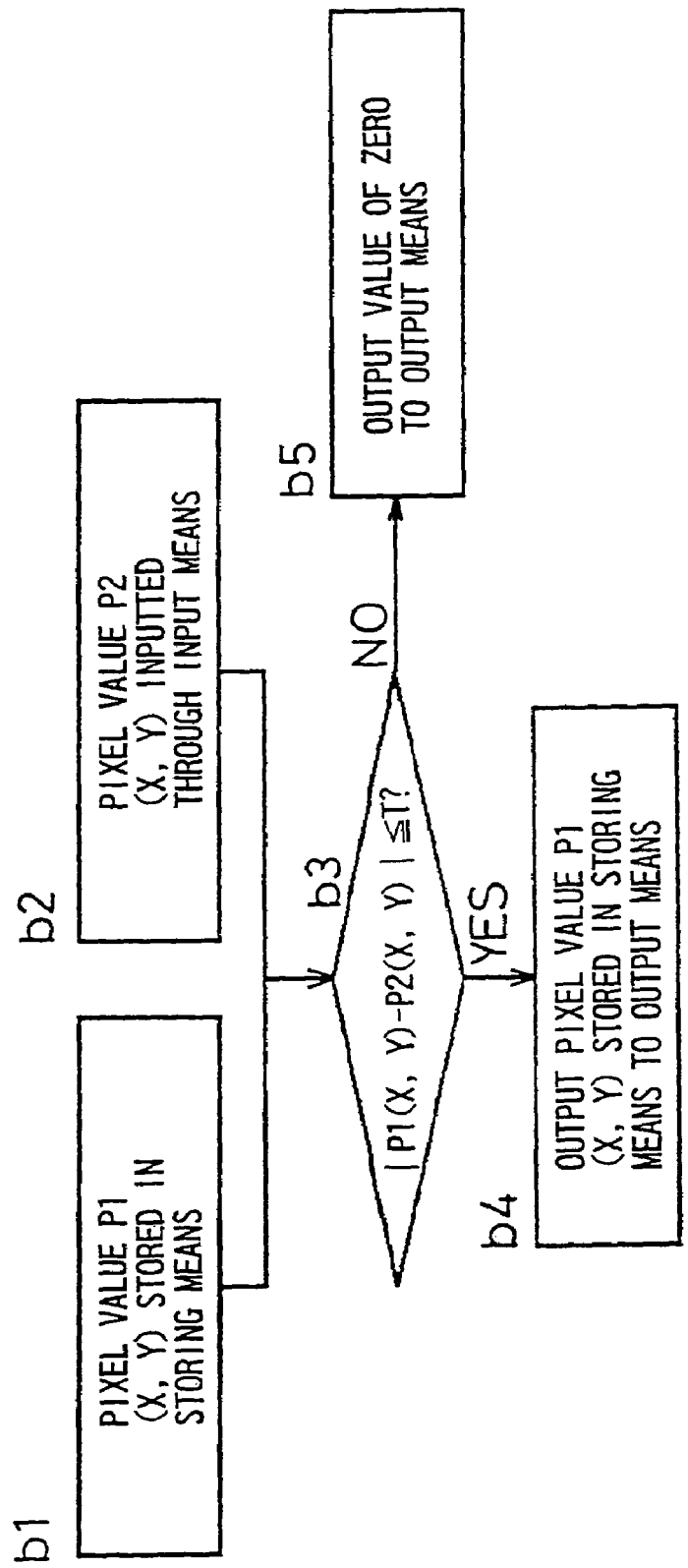
FIG. 5 is a flow chart showing the details of a step of a comparing process in the flow chart of FIG. 4.

FIG. 5 shows the contents of the process of comparing images carried out at steps a4, a7 of FIG. 4. At step b1, a pixel value P1 (X, Y) of a coordinate position (X, Y) of an image stored in the storing means 5 is read out. At step b2, a pixel value P2 (X, Y) corresponding to the coordinate position (X, Y) read out of the storing means 5 is inputted to an image inputted through the input means 3. At step b3, the calculating means 4a included in the comparing means 4 calculates a difference D between the pixel values in accordance with a first expression as shown below:

$$D=|P1(X,Y)-P2(X,Y)| \qquad (1)$$

Assuming a threshold value set through the threshold value setting section 27 to be T, the comparing means 4 judges whether $D \leq T$, that is, a second expression as shown below is held or not:

$$D=|P1(X,Y)-P2(X,Y)| \leq T \qquad (2)$$

When it is judged that the condition is held at step b3, they are recognized as a common portion, and the pixel value P1 (X, Y) stored in the storing means 5 is outputted from the comparing means via the output means 6 at step b4. When it is judged that the condition is not held at step b3, the comparing means 4 outputs a value of zero to the output means 6 at step a5.

In the case of processing a color image, steps as shown below will be followed. In this case, an image stored in the storing means 5 is denoted by P1, in which the primary-color components of red, green, and blue are respectively denoted by P1r, P1g, P1b, and an image inputted through the input means 3 is denoted by P2, in which the primary-color components of red, green, and blue are respectively denoted by P2r, P2g, P2b. Further, the absolute values of the respective differences between P1r and P2r, P1g and P2g, P1b and P2b are denoted by Dr, Dg, Db, and the threshold values of the respective primary-color components set through the threshold value setting section 27 are denoted by Tr, Tg, Tb. In a case where $Dr \leq Tr$ and $Dg \leq Tg$ and $Db \leq Tb$ are held, they are recognized as a common portion, and the pixel value P1 (X, Y) is sent to the output means 6. On the other hand, in a case where Dr>Tr or Dg>Tg or Db>Tb is held, a value of zero is sent to the output means 6 as a pixel value. In the case of carrying out a process of outputting from two documents, a pixel value of a result of comparison by the comparing means 4 is sent from the output means 6 to the image processing section 20. In the case of carrying out a process of extracting from three or more documents, a result of comparison by the comparing means 4 is sent from the output means 6 to the image processing section 20 only when the last document is compared, and at other times, a result of comparison by the comparing means 4 is sent from the output means 6 to the storing means 5 and replaced with data previously stored in the storing means.

Extracting from three or more documents a portion common thereto makes it possible to extract a common portion more precisely than extracting from two documents a portion common thereto. For example, although hand-written notes which are overlapped by coincident in two documents would be extracted and outputted as a common portion as they are, such a coincidental overlap is less possible in three or more documents, and therefore, a common portion can be extracted more precisely.

Subsequently, working steps in the case of eliminating a portion common to two documents therefrom will be illustrated referring to FIG. 6. For differentiation between the two documents, they are expressed as a document A and a document B, respectively. First, at step c1, the document A is read in the same manner as at step a1 of FIG. 4. At step c2, the following document B is subjected to detection of a positional displacement in the same manner as at step a2 of FIG. 4. Operations conducted by the user are also the same as at steps a1, a2 of FIG. 4. At step c3, the user pushes the eliminating button 26 to designate the eliminating function. The user sets a threshold value through the threshold value setting section 27 when necessary. Next, when the user pushes the output button 29, the copier starts scanning the document B. At step c4, the comparing means 4 carries out the comparing process. All the pixels of the document B are sequentially subjected to the comparing process, and a common portion is eliminated. At step c5, an image is given for each pixel from the output means 6 to the image processing section 20, where the image is processed, and at step c6, the image is printed by the printing mechanism 15 onto a recording medium such as a sheet of paper. Next, at step c7, the image of the document A stored in the storing means 5 is read out by the output means 6 and sent to the image processing section 20, and at step c8, the image is printed by the printing mechanism 15. With these steps, when two documents with different contents contain the same unnecessary image such as a ruled line of a notebook or a steady noise due to a defect of the printing mechanism, it is possible to produce a document by eliminating the unnecessary image from the two documents.

Figure 6:
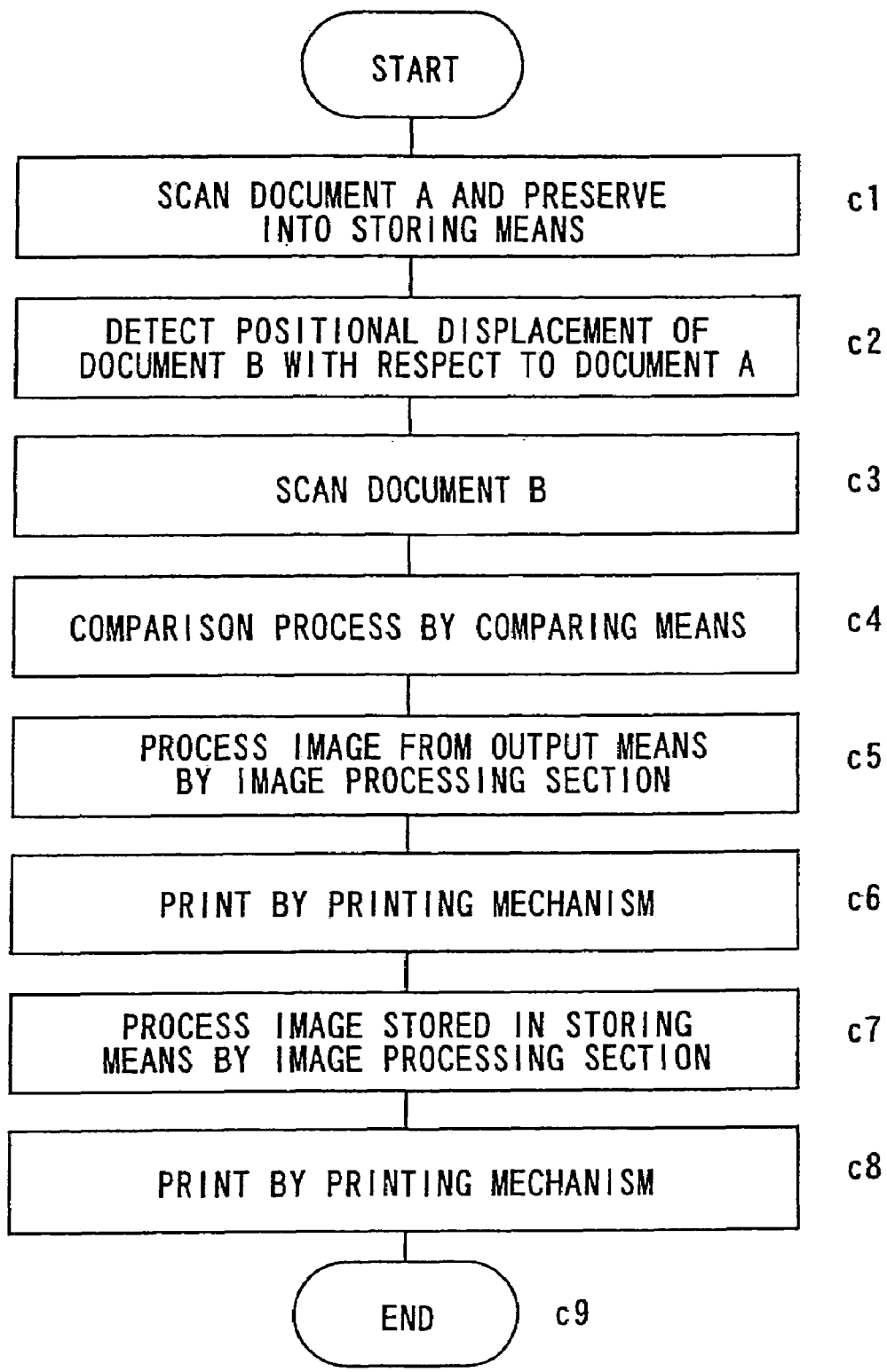
FIG. 6 is a flow chart showing steps of a processing procedure during operation of an eliminating facility in the image processing apparatus of FIG. 1.
Figure 7:
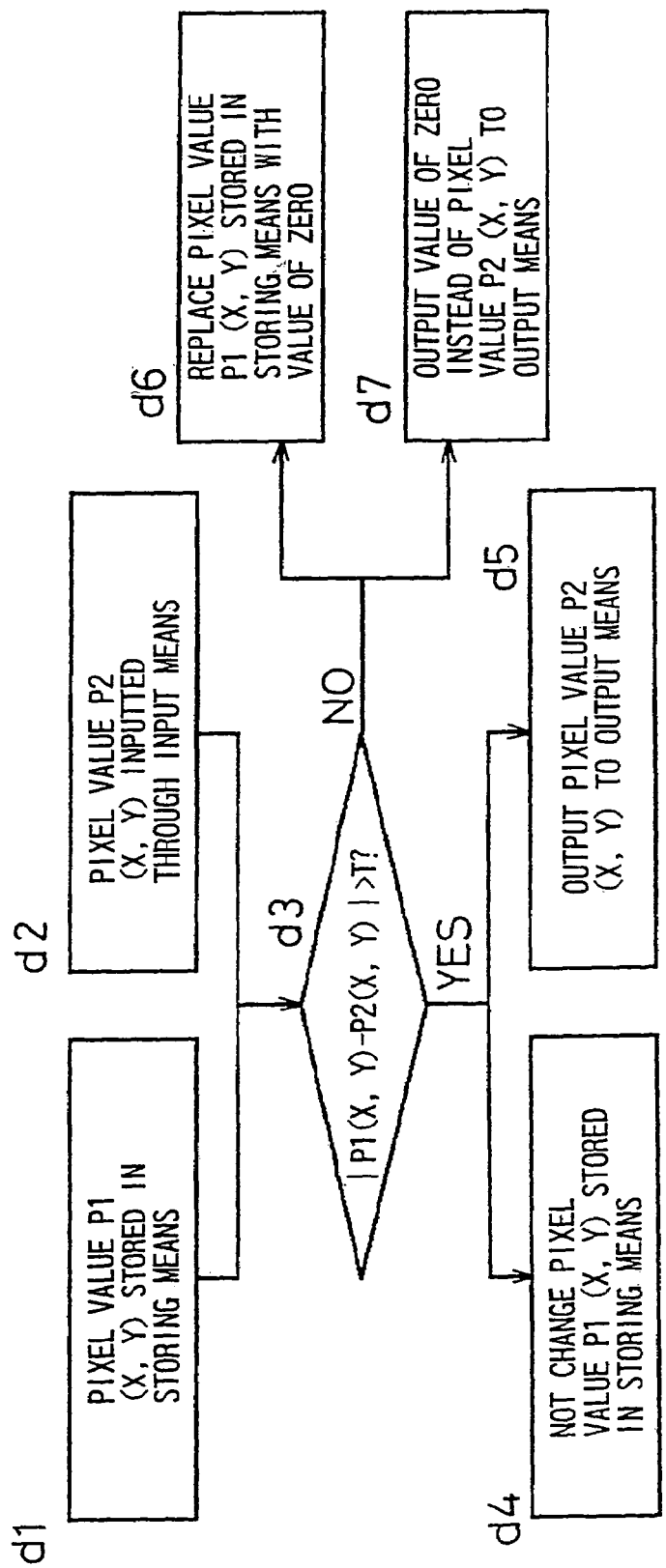
FIG. 7 is a flow chart showing the details of a step of a comparing process in the flow chart of FIG. 6.

FIG. 7 shows the contents of the comparison process carried out at step c4 of FIG. 6. At steps d1, d2, in the same manner as at steps b1, b2 of FIG. 5, a stored pixel value P1 (X, Y) and an inputted pixel value P2 (X, Y) are read out. At step d3, the calculating means 4a included in the comparing means 4 compares the two kinds of read pixel values P1 (X, Y), P2 (X, Y), and calculates the absolute value D of the difference between the pixel values P1, P2 in accordance with the same expression as the first expression. Then, it is judged whether or not the condition shown by a third expression as shown below is held for the absolute value D and the threshold value T (step d3):

$$D=|P1(X,Y)-P2(X,Y)|>T \quad (3)$$

When it is judged that the above condition is held, the pixel value P1 (X, Y) stored in the storing means 5 is not changed at step d4, and the inputted pixel value P2 (X, Y) is sent to the output means 6 and outputted at step d5. When it is judged that the above condition is not held at step d3, the pixel value P1 (X, Y) stored in the storing means 5 is replaced with a value of zero at step d6, and the value of zero instead of the inputted pixel value P2 (X, Y) is sent to the output means 6 and outputted at step d7.

In the case of processing a color image, in the same manner as the extraction mode described before, the components of RGB primary colors are respectively subjected to the same comparison process as at step d3 by using the absolute values Dr, Dg, Db of the differences between P1 and P2 and threshold values Tr, Tg, Tb. In a case where Dr>Tr or Dg>Tg or Db>Tb is held, the pixel value P1 (X, Y) stored in the storing means 5 is not changed, and the inputted pixel value P2 (X, Y) is sent to the output means 6. In a case where Dr≦Tr and Dg≦Tg and Db≦Tb are held, the pixel value P1 (X, Y) stored in the storing means 5 is replaced with a value of zero, and the value of zero instead of the inputted pixel value P2 (X, Y) is sent to the output means 6.

Figure 8:
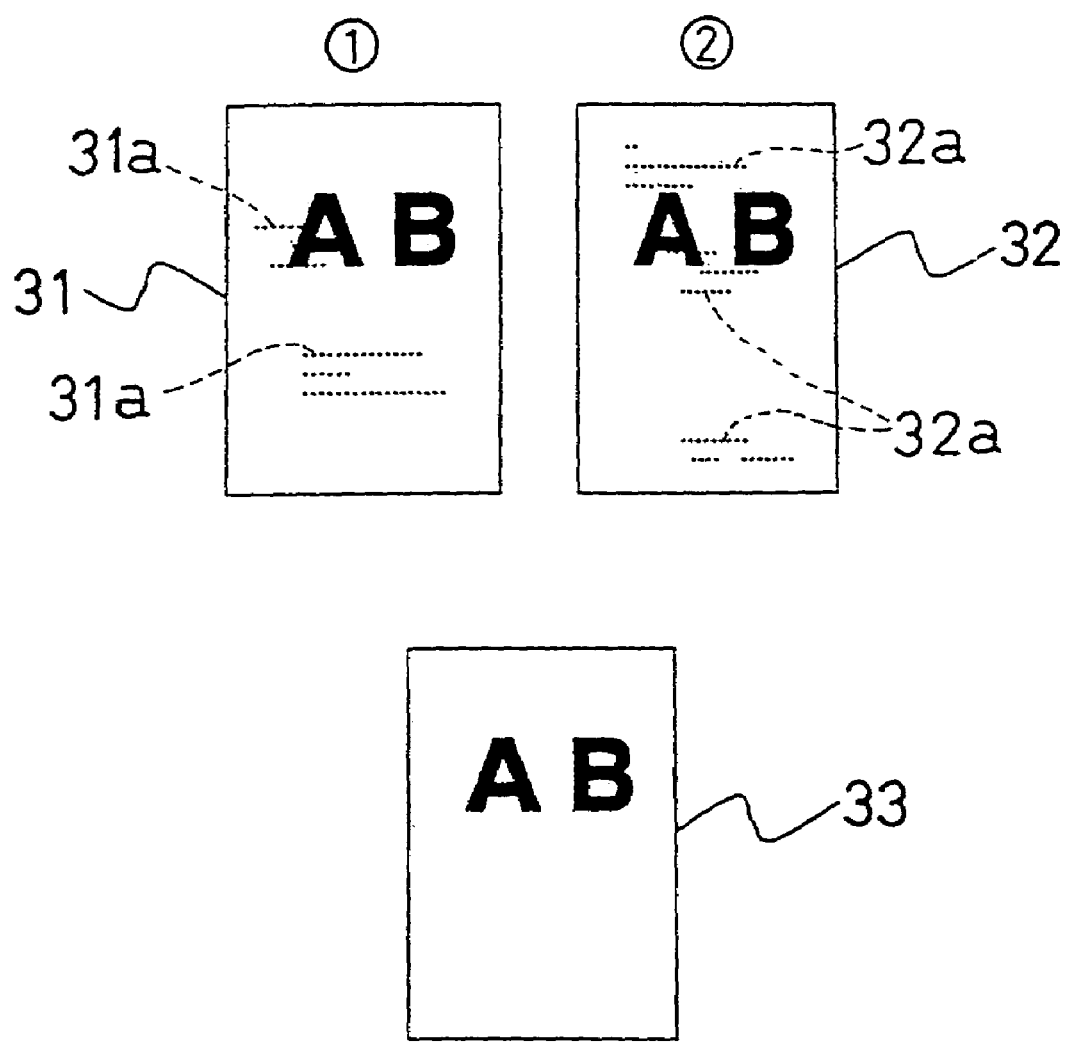
FIG. 8 is a view showing images which can be obtained during operation of the extracting facility shown by FIGS. 4, 5.

FIG. 8 shows a status of eliminating a non-common portion 31a contained in an image 31 of the document A and a non-common portion 32a contained in an image 32 of the document B and outputting an image 33 which contains only a common portion, with steps of FIGS. 4, 5. For example, the non-common portions 31a, 32a contained in the images 31, 32 are portions of hand-written notes, which do not exist at identical positions in the documents A and B.

Figure 9:
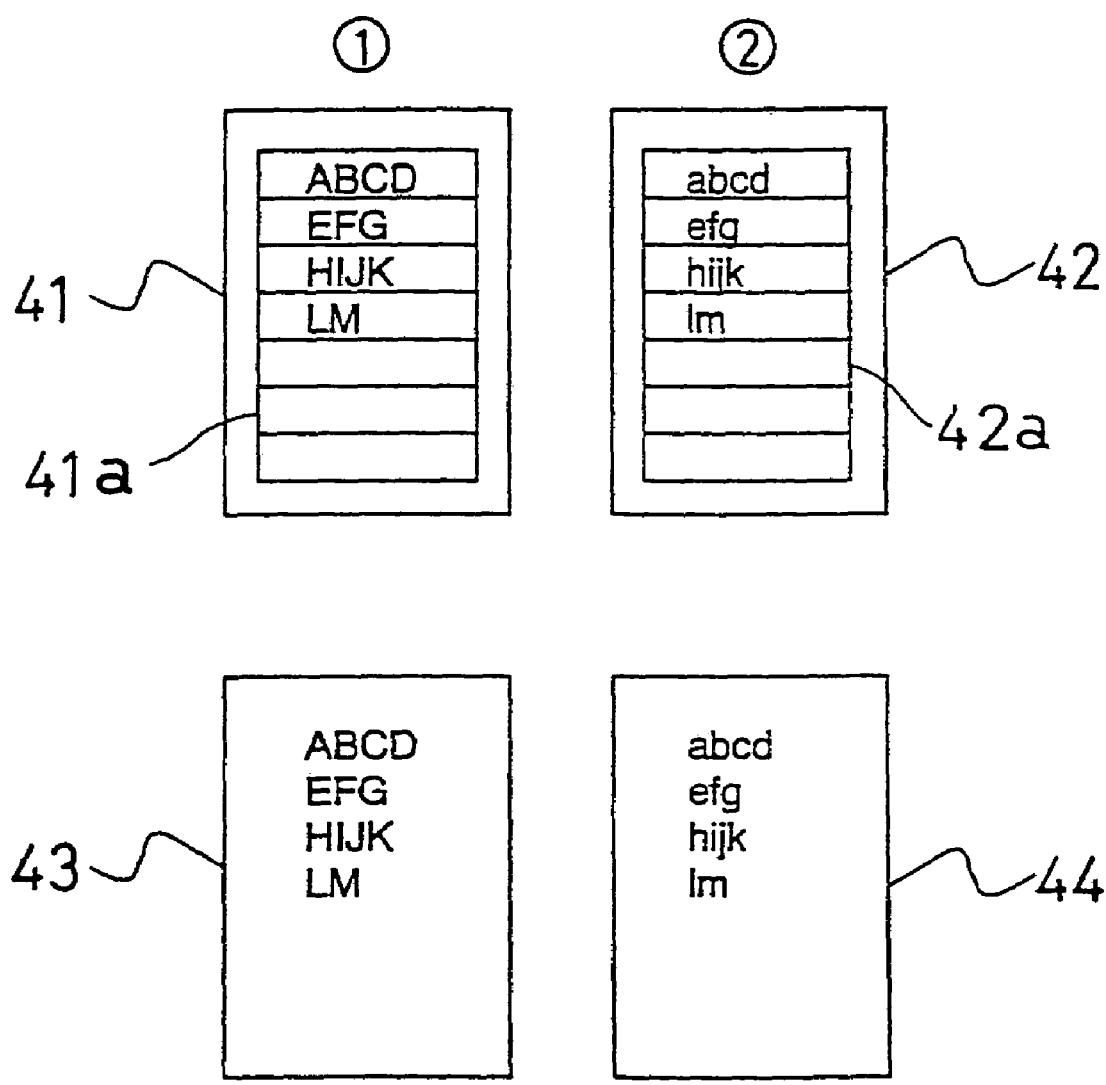
FIG. 9 is a view showing images which can be obtained during operation of the eliminating facility shown by FIGS. 6, 7.

FIG. 9 shows a status of eliminating common portions 41a, 42a from images 41, 42 of the two documents A and B and outputting images 43, 44, with steps of FIG. 6, 7. For example, the common portions 41a, 42a are ruled lines and frames, and the images 43, 44 are outputted after the common portions 41a, 42a are eliminated.

Although the embodiment illustrated above shows an example, in a color digital copier, of reading a plurality of documents to extract and output a common portion as an image, and to eliminate a common portion and output images of the respective documents, the invention can be applied to image processing of not only an inputted image directly read from a document, but also image data previously stored in a recording medium, and an image transmitted via communication network. Further, the invention can be utilized not only in recognizing a common portion to extract and output the common portion as an image or to eliminate the common portion from images, but also in checking of detecting a similarity level among a plurality of images.

As illustrated above, in the image processing method of the invention, an image is outputted in such a manner that an inputted image is stored on a pixel-by-pixel basis as pixel values which represent pixel densities, pixel values of a newly inputted image are compared with the pixel values of the stored image, a portion common to the newly inputted image and the stored image is recognized, and the common portion is subjected to predetermined image processing. Thus, only by inputting an image, it is possible to make the apparatus perform image processing based on recognition of a common portion. Since an operation such as setting a region is not required, it is possible to make the apparatus perform image processing based on recognition of a common portion easily and speedily. As described above, an image is outputted in such a manner that a common portion is recognized from differences in pixel values between inputted images and the common portion is subjected to predetermined image processing. Accordingly recognition of the common portion can be carried out with a simple operation.

Further, in the image processing method, only when a difference in pixel values which is a result of comparing pixel values between the two images is equal to or less than a preset threshold value, the image processing result is outputted. Thus, only a common portion within the range of a set threshold value can be outputted as an image. For example, in a case where there are two printed matters in which hand-written notes are written so as to overlap printed contents, the hand-written notes are different in the respective printed matters, so that only the printed contents as a common portion can be outputted as an image. As described above, a common portion in which a difference in pixel values is equal to or less than a threshold value can be outputted as an image processing result, so that image processing such as output of only a portion common to images can be carried out in a simple manner.

Still further, in the image processing method, when a difference in pixel values which is a result of comparing pixel values between the two images is equal to or less than a preset threshold value, the pixel values of the inputted image and the stored image are replaced with a value of zero, and the respective images are outputted as the image processing result. Thus, an image in which a portion common to one image and another image is eliminated from the one image can be outputted in a simple manner. For example, in the case of adding a hand-written note to printed matter, image processing such as leaving only the hand-written note and eliminating printed contents can also be carried out. As described above, an image processing result obtained by eliminating a common portion in which a difference in pixel values is equal to or less than a threshold value can be outputted, so that it is possible in a simple manner to make the apparatus output only a different portion between images as the image processing result.

Still further, in the image processing method, images are inputted by reading documents, and pixel values are compared after a positional displacement between the documents is corrected. Thus, pixel values are compared after a positional displacement between the documents is corrected, so that it is possible to avoid an effect of the positional displacement between the documents, and make the apparatus recognize a portion common to the images to output an image processing result such as an output of only the common portion or an output of an image from which the common portion is eliminated. As described above, images to be subjected to image processing are inputted by reading from documents, and a positional displacement between the documents is corrected before carrying out a comparison between the images, so that it is avoided that an inherent common portion is not recognized as a common portion because of a positional displacement between the documents, and recognition of a common portion can be precisely performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising at least:
   input means for carrying out a distribution process of image information associated with an image inputted through an image input mechanism;
   storing means for storing image information associated with an image input through the image input mechanism;
   comparing means for comparing image information associated with an image newly input through said image input mechanism with image information associated with an image previously stored in the storing means;
   output means for outputting from the image processing apparatus pixels generated from the results of comparisons performed by the comparing means; and
   a positional displacement detecting device for detecting a positional displacement relative to said input mechanism between a source of a previously input image and a source of an image to be newly inputted;
   wherein the comparing means includes calculating means for calculating a difference in pixel values which represent pixel densities, between image information associated with an image newly inputted through said input mechanism and image information associated with an image previously stored in the storing means, and recognizing means for recognizing a portion common to the stored and newly input images by comparing an output of the comparing means with a preset threshold value;
   wherein the comparing means includes extracting means for causing the output means to output from the image forming apparatus only pixels corresponding to pixels of the stored and newly input images respectively recognized by the recognizing means when the difference in pixel values calculated by the calculating means is equal to or less than said preset threshold value and
   wherein a warning of a positional displacement relative to said input mechanism between a source of a previously input image and a source of an image to be newly inputted is provided on a display means in a case where a positional displacement is detected by said positional displacement detecting device.

2. The image processing apparatus of claim 1, further comprising:
   setting means for allowing a user to set said threshold value.

3. An image processing apparatus comprising at least:
   input means for carrying out a distribution process of image information associated with an image inputted through an image input mechanism;
   storing means for storing image information associated with an image input through the image input mechanism;
   comparing means for comparing image information associated with an image newly input through said image input mechanism with image information associated with an image previously stored in the storing means;
   output means for outputting from the image processing apparatus pixels generated from the results of comparisons performed by the comparing means; and
   a positional displacement detecting device for detecting a positional displacement relative to said input mechanism between a source of a previously input image and a source of an image to be newly inputted;
   wherein the comparing means includes calculating means for calculating a difference in pixel values which represent pixel densities, between image information associated with an image newly inputted through said input mechanism and image information associated with an image previously stored in the storing means, and recognizing means for recognizing a portion common to the stored and newly input images by comparing an output of the comparing means with a preset threshold value;
   wherein the comparing means includes extracting means for causing the output means to output from the image forming apparatus only pixels corresponding to pixels of the stored and newly input images respectively recognized by the recognizing means when the difference in pixel values calculated by the calculating means is equal to or less than said preset threshold value;

wherein a comparison result is sent (i) to image processing means including at least one of color correcting means, black producing means, filter processing means, halftone processing means and a printing mechanism, or (ii) to said storage means;

wherein said output means has a further function of sending an image read from said storage means to image processing means including color correcting means; and wherein a warning of a positional displacement relative to said input mechanism between a source of a previously input image and a source of an image to be newly inputted is provided on a display means in a case where a positional displacement is detected by said positional displacement detecting device.

\* \* \* \* \*